United States Patent [19]
Hansen

[11] Patent Number: 5,636,940
[45] Date of Patent: Jun. 10, 1997

[54] APPARATUS AND METHOD FOR GAS AND/OR LIQUID EXCHANGE BETWEEN AN AREA OUTSIDE AND AN AREA INSIDE A BULK MATERIAL PILE

[75] Inventor: David L. Hansen, Averill Park, N.Y.

[73] Assignee: Landfill Technologies, Inc., West Sand Lake, N.Y.

[21] Appl. No.: 563,998

[22] Filed: Nov. 29, 1995

[51] Int. Cl.⁶ .................... B09B 1/00; B09B 3/00
[52] U.S. Cl. ............... 405/128; 71/901; 166/50; 210/901; 405/129
[58] Field of Search ............... 47/74; 71/901; 166/369, 370, 50; 210/901; 405/128, 129, 258

[56] References Cited

U.S. PATENT DOCUMENTS

| | | |
|---|---|---|
| 4,026,355 | 5/1977 | Johnson et al. ............. 166/369 X |
| 4,442,901 | 4/1984 | Zison ............................. 166/369 |
| 4,670,148 | 6/1987 | Schneider ..................... 405/129 X |
| 4,936,706 | 6/1990 | Lüftenegger et al. ......... 405/129 X |
| 4,956,002 | 9/1990 | Egarian ........................... 71/901 X |
| 5,067,852 | 11/1991 | Plunkett ............................ 405/128 |
| 5,265,979 | 11/1993 | Hansen ............................. 405/129 |
| 5,286,140 | 2/1994 | Mather .............................. 405/128 |
| 5,340,236 | 8/1994 | Ikenberry ........................ 405/128 |
| 5,564,862 | 10/1996 | Markels, Jr. .................... 405/129 |

*Primary Examiner*—George A. Suchfield
*Attorney, Agent, or Firm*—Heslin & Rothenberg, P.C.; Wayne F. Reinke, Esq.

[57] ABSTRACT

Gas and/or liquid exchange between a first area within a bulk material pile and a second area outside the bulk material pile is enabled by creating a substantially horizontal cavity during the formation of the bulk material pile, and establishing a conduit between the cavity and the area outside the bulk material pile during the formation of the bulk material pile. Where the bulk material pile is a solid waste pile, the cavity may be created using a substantially horizontal, elongated leaching chamber, and the conduit may be created with a system of pipes.

29 Claims, 5 Drawing Sheets

APPARATUS AND METHOD FOR GAS AND/OR LIQUID EXCHANGE BETWEEN AN AREA OUTSIDE AND AN AREA INSIDE A BULK MATERIAL PILE

BACKGROUND OF THE INVENTION

1. Technical Field

The present invention generally relates to gas and/or liquid exchange. More particularly, the present invention relates to gas and/or liquid exchange between a first area within a bulk material pile and a second area outside the bulk material pile via a conduit connecting the first and second areas.

2. Background Information

When placed in a pile, bulk materials, such as organic solid waste, decompose or otherwise interact to create gases. For organic solid waste, the gases are principally methane and carbon dioxide, with small amounts of hydrogen sulfide, mercaptan and other trace gases. Landfills housing organic solid waste piles are a significant source of such gases, which are odorless, flammable, explosive, toxic and contribute to atmospheric deterioration. Combustion or other treatment of collected landfill gases is a common way to mitigate the negative effects of the raw gas emissions.

Existing commercially available gas extraction systems primarily include vertical drilled wells and associated piping and valves, which are installed only after a given section of the landfill is completely filled and capped. This may be many years after gas production is occurring at high rates in the waste mass, allowing a significant volume of solid waste gases to be emitted uncontrolled prior to installation of such systems. In addition, such vertical systems are prone to clogging.

Another problem is that low moisture content within a solid waste pile slows microbial activity, thus prolonging the time that the solid waste is in an unstable, dynamic biological state. This condition requires greater surveillance and maintenance efforts. Organic waste that is fully biostabilized, such as cured compost, is much more desirable, due to predictable settlement rates and reduced gas production.

Thus, a need exists for a way to provide gas and/or liquid exchange between an area within a bulk material pile and an area outside the bulk material pile.

SUMMARY OF THE INVENTION

Briefly, the present invention satisfies the need for gas and/or liquid exchange between an area within a bulk material pile and an area outside the bulk material pile by creating a cavity within the bulk material pile during formation thereof, and establishing a conduit between the cavity and the area outside the bulk material pile.

In accordance with the above, it is an object of the present invention to provide apparatus for gas and/or liquid exchange with a bulk material pile.

It is another object of the present invention to provide a method for gas and/or liquid exchange with a bulk material pile.

The present invention provides, in a first aspect, apparatus for gas and/or liquid exchange between a first area inside a bulk material pile and a second area outside the bulk material pile. The apparatus comprises a leaching chamber for substantially horizontal placement within the first area during formation of the bulk material pile. The apparatus further comprises a conduit for placement partially within the leaching chamber and partially in the second area, thereby providing a medium for the gas and/or liquid exchange. As used herein, the term "leaching chamber" refers to any structure that creates a cavity within a bulk material pile and discourages intrusion of bulk material into an area surrounding the portion of the conduit covered thereby, while encouraging gas and/or liquid exchange between the bulk material pile and the cavity.

The present invention provides, in a second aspect, a method of exchanging gas and/or liquid between a bulk material pile and an area outside the bulk material pile. The method of the second aspect comprises forming the bulk material pile such that a cavity is created therein, and establishing a conduit between the cavity and the area outside the bulk material during the formation of the bulk material pile. The method may further comprise the step of exchanging the gas and/or liquid between the cavity and the area outside the bulk material pile through the conduit.

The present invention provides, in a third aspect, a method of accelerating the decomposition of solid waste in a solid waste pile. The method of the third aspect comprises forming the solid waste pile such that a liquid is injectable from an area outside the solid waste pile into a substantially horizontal cavity inside the solid waste pile. The method further comprises injecting the liquid from the area outside the solid waste pile into the cavity, thereby increasing the moisture content of the solid waste to accelerate the decomposition thereof.

The present invention provides, in a fourth aspect, a method of removing a gas from a solid waste pile. The method of the fourth aspect comprises forming the solid waste pile such that a substantially horizontal cavity is created inside the solid waste pile. The method further comprises allowing the solid waste pile to produce the gas, allowing the gas to enter the cavity and removing the gas from the cavity to an area outside the solid waste pile.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
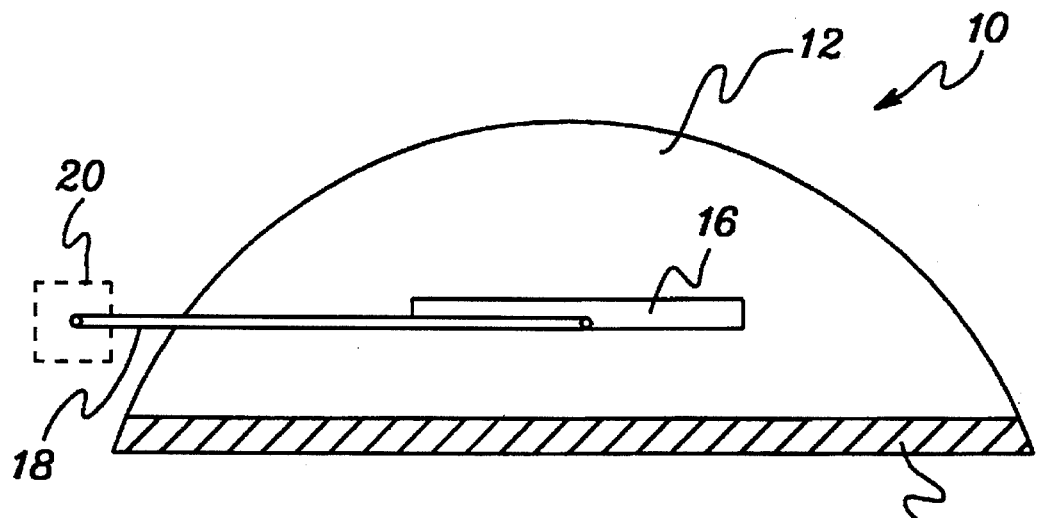
FIG. 1 is a cross-sectional view of a bulk material pile constructed in accordance with the present invention.

FIG. 1 is a cross-sectional view of a bulk material pile 10 constructed in accordance with the present invention. Bulk material pile 10 is situated on a base 14, and comprises bulk material 12, substantially horizontal cavity 16 and conduit 18. Although only one conduit is shown, the present invention contemplates any number. Cavity 16 is created during the formation of bulk material pile 10 by the addition of some structure that both discourages the intrusion of bulk material 12 into cavity 16 and encourages gas and/or liquid exchange between the cavity and area 20 outside bulk material pile 10.

As used herein, the term "bulk material" is intended to encompass any material that, when in a pile, would benefit from gas and/or liquid exchange; that is, removal of a gas and/or liquid produced therein, or the addition of a gas and/or liquid thereinto (as opposed to merely adding to the surface of the pile). One example of a bulk material is solid waste such as might be found in a landfill. As used herein, the term "conduit" means any structure that is capable of being a medium for channeling a gas and/or liquid, depending on the situation, between at least two locations. One example of a conduit is a pipe or system of pipes. As used herein, the term "substantially horizontal" is intended to distinguish from vertical and includes a slope of up to about five degrees. The term "substantially horizontal" is also intended to refer to surfaces that, although roughly horizontal in the aggregate, may contain localized dips or humps.

Figure 2:
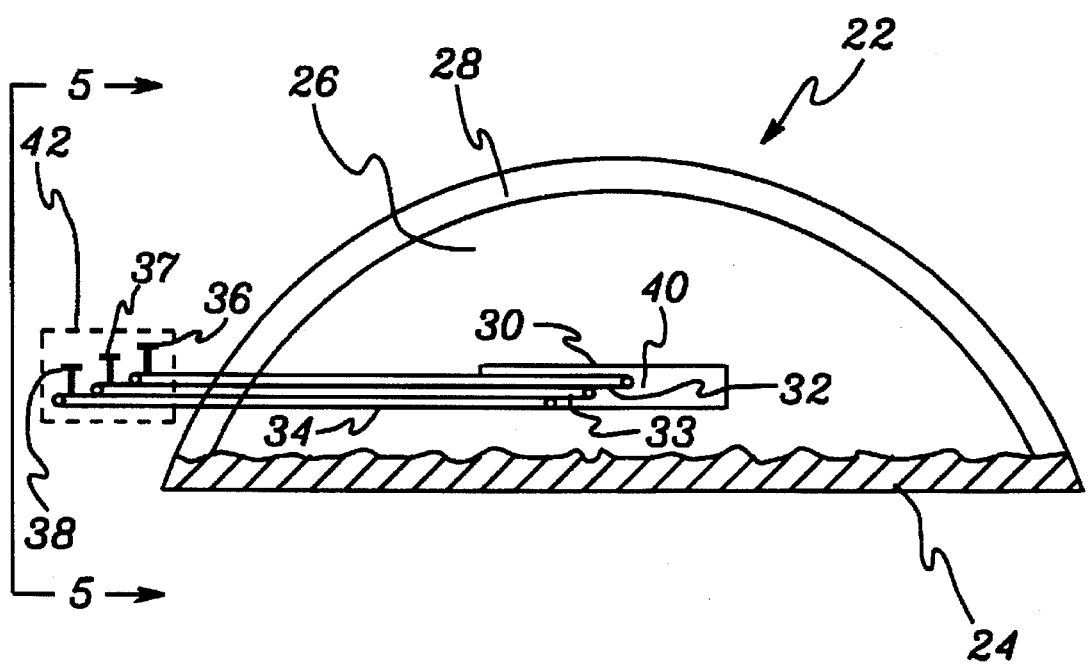
FIG. 2 is a cross-sectional view of a solid waste pile constructed in accordance with the present invention.

FIG. 2 is a cross-sectional view of a solid waste pile 22 constructed in accordance with the present invention. Solid waste pile 22 is situated on ground 24 and comprises solid waste 26, solid waste cap 28, elongated leaching chamber 30 and conduits 32, 33 and 34. As used herein, the term "elongated leaching chamber" refers to a leaching chamber existing along a roughly horizontal line through a majority of a width of a given bulk material pile. For solid waste, the leaching chamber is preferably elongated, so that conduits into the leaching chamber are accessible from outside the solid waste pile without an undue amount of the conduit existing in the pile uncovered. Conduits 32, 33 and 34 extend outside solid waste pile 22 and terminate at valves 36, 37 and 38, respectively. Valves 36, 37 and 38 are preferably the "butterfly" type, as they are known in the art. Solid waste cap 28 provides a barrier between solid waste 26 and the ambient air and could be, for example, a layer of dirt. As used herein, the term "leaching chamber" refers to any structure that creates a cavity within a bulk material pile and discourages intrusion of bulk material (here, solid waste 26) into an area (here, area 40) surrounding the portion of the conduit(s) (here, conduits 32, 33 and 34) covered thereby, while encouraging gas and/or liquid exchange between the bulk material pile and the cavity. The conduit(s) may then be used to exchange gas and/or liquid to/from the cavity.

Before solid waste 26 stabilizes, the decomposition thereof typically creates solid waste gases within the solid waste pile, for example, methane, carbon dioxide, hydrogen sulfide, and mercaptan. As used herein, the term "solid waste gas" refers to any single gas or combination of gases produced by the decomposition or other interaction of solid waste. The build-up of solid waste gases can create an unpleasant and potentially dangerous environment. Leaching chamber 30 allows the solid waste gases to enter area 40, rather than being released into the ambient air. Valves 36, 37 and 38 can be opened to allow the built-up solid waste gases to escape or be extracted, reducing the unpleasant and dangerous conditions. Conventional or other methods of disposing of collected solid waste gases may then be used, such as combustion.

One way to accelerate the decomposition and resultant stabilization of a solid waste pile is to add moisture thereto. A liquid, for example, water, can be added to solid waste 26 through conduits 32, 33 and 34. Optionally, waste water collected in the landfill, referred to as "leachate" could be injected into area 40 through conduits 32, 33 and 34. As used herein, the term "injected" includes any method of getting liquid into a bulk material pile through a conduit, including, for example, gravity or pressure. This would provide a low-cost method of leachate disposal while also accelerating the solid waste decomposition process.

Figure 3:
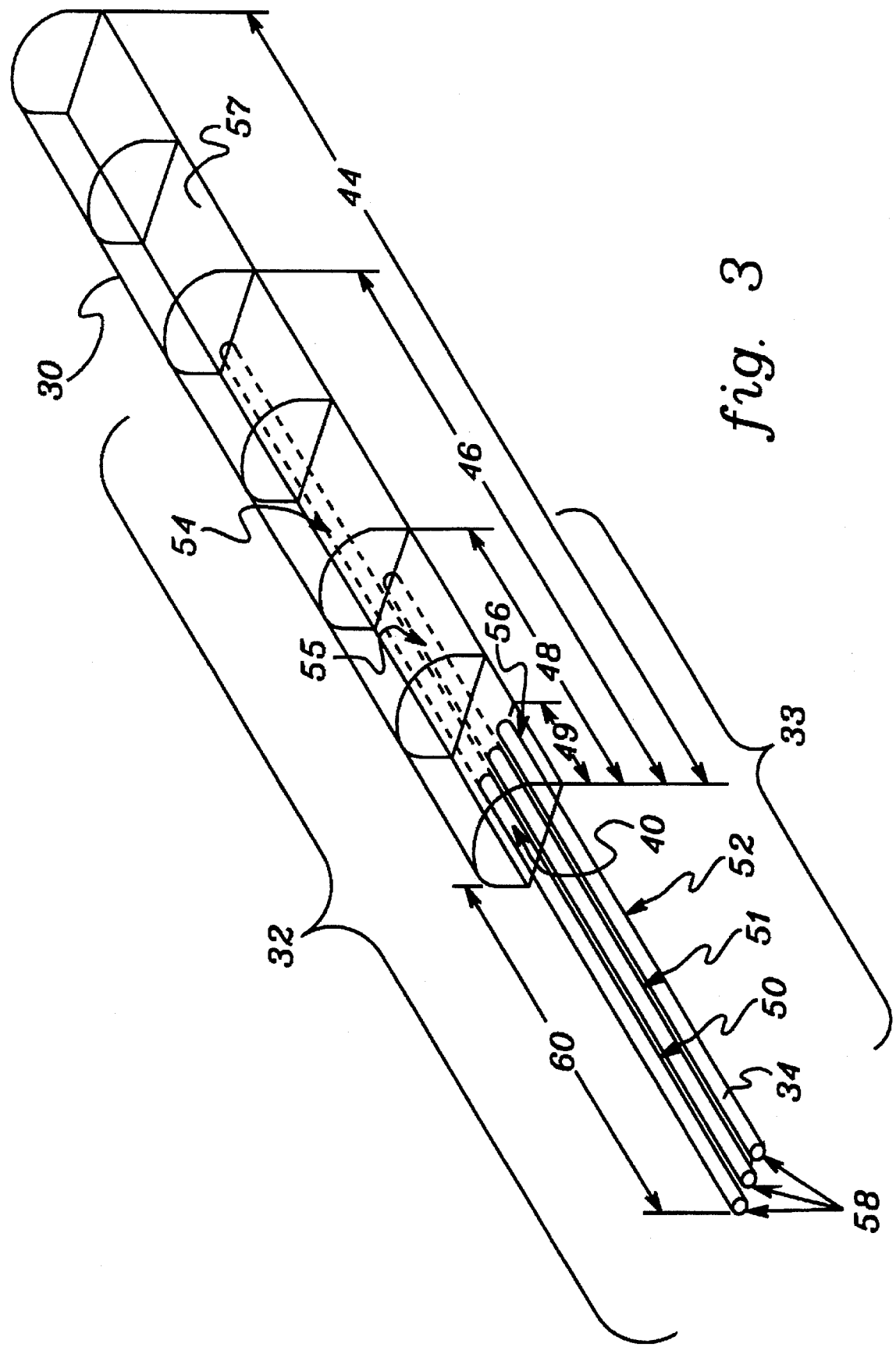
FIG. 3 is a perspective view of the elongated leaching chamber and conduits of FIG. 2.

FIG. 3 is a perspective view of elongated leaching chamber 30 and conduits 32, 33 and 34 of FIG. 2, shown in greater detail. Assume that leaching chamber 30 has a length 44 given as L. Preferably, for the present solid waste pile example, conduit 32 extends into area 40 a length 46, which is about (2*L)/3; that is, two thirds of L. Also preferably, conduit 33 extends into area 40 a length 48, which is about L/3; that is, one third of L, and conduit 34 extends just into area 40, a length 49, which is less than length 48. In this way, gas and/or liquid exchange reaches throughout area 40. Portions 50, 51 and 52 of conduits 32, 33 and 34, respectively, extend outside area 40 and should be strong enough to prevent collapsing under the weight of the solid waste on top thereof. For example, PVC (poly(vinyl chloride)) pipe of sufficient size for the particular solid waste pile could be used for conduit portions 50, 51 and 52. Since portions 54, 55 and 56 of conduits 32, 33 and 34, respectively, are covered by leaching chamber 30, they need not be as strong as portions 50, 51 and 52, however, they could be. In the present example, portions 54 and 55 are thin-wall roll drainage pipes. At least some areas of chamber floor 57 are in some manner left open to the solid waste so that gas and/or liquid exchange with the solid waste pile is encouraged. Valves 36, 37 and 38 (not shown in FIG. 3) attach at pipe ends 58. For a typical solid waste pile in a landfill, a length 60 of conduit portions 50, 51 and 52 might be about 16 feet, and length 49 might be about 4 feet.

Figure 4:
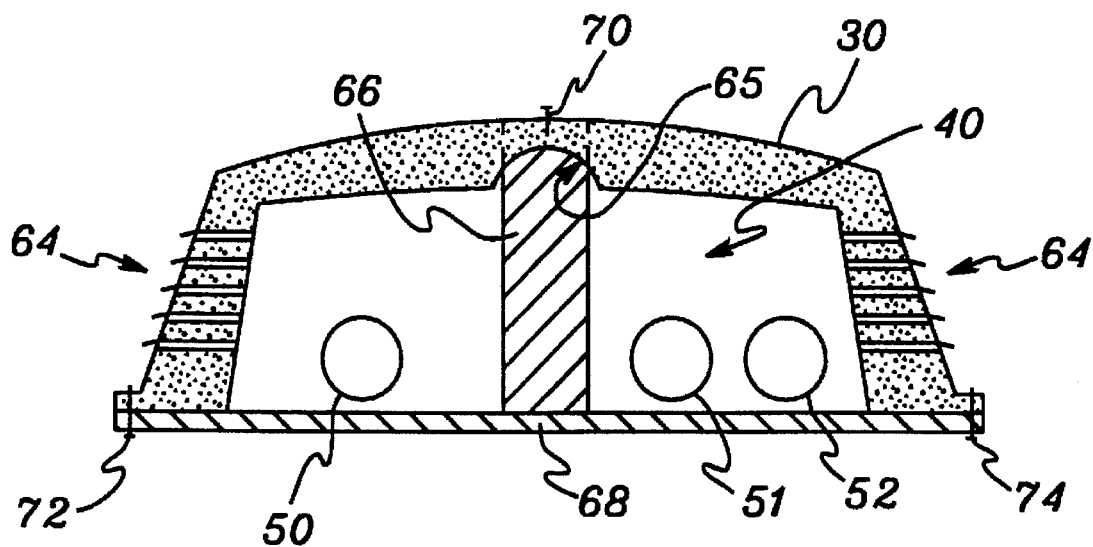
FIG. 4 is a cross-sectional view of the elongated leaching chamber of FIG. 3.

FIG. 4 is a cross-sectional view of elongated leaching chamber 30 from FIG. 3. Leaching chamber 30 is dome-like in shape, although other shapes are possible, such as a rectangle. Optional louvered vents 64 serve as another entrance for gases produced by the solid waste to enter area 40 while discouraging the intrusion of solid waste into area 40. Vents 64 also serve as another exit for liquid entering area 40 through conduits 32, 33 and 34. As shown in FIG. 4, leaching chamber 30 may take the form of a conventional sectioned molded plastic leaching chamber, such as that used in leach fields. Indentation 65 is meant for piping in a leach field environment, but has no use in the present example. Alternatively, a leaching chamber could be custom designed to suit the particular situation that does not need reinforcing members. However, conventional leaching chambers may not be strong enough to withstand the weight of some bulk material piles. Thus, conventional leaching chambers may need to be reinforced.

Vertical reinforcing member 66 and horizontal reinforcing member 68 are added in the present example to ensure the stability of leaching chamber 30. Vertical reinforcing member 66 may be, for example, a recycled plastic load column, and horizontal reinforcing member 68 may be, for example, a recycled plastic strap. Vertical reinforcing member 66 is secured to leaching chamber 30 with, for example, self-tapping polymer joining screw 70. Similarly, horizontal reinforcing member 68 may be secured to leaching chamber 30 by, for example, self-tapping polymer joining screws 72 and 74. It will be understood that several sets of reinforcing members 66 and 68 would be spaced apart along the length of elongated leaching chamber 30, leaving "floor" spaces in area 40 of solid waste, the main entrance/exit for gases and/or liquid into or out of the solid waste pile.

Figure 5:
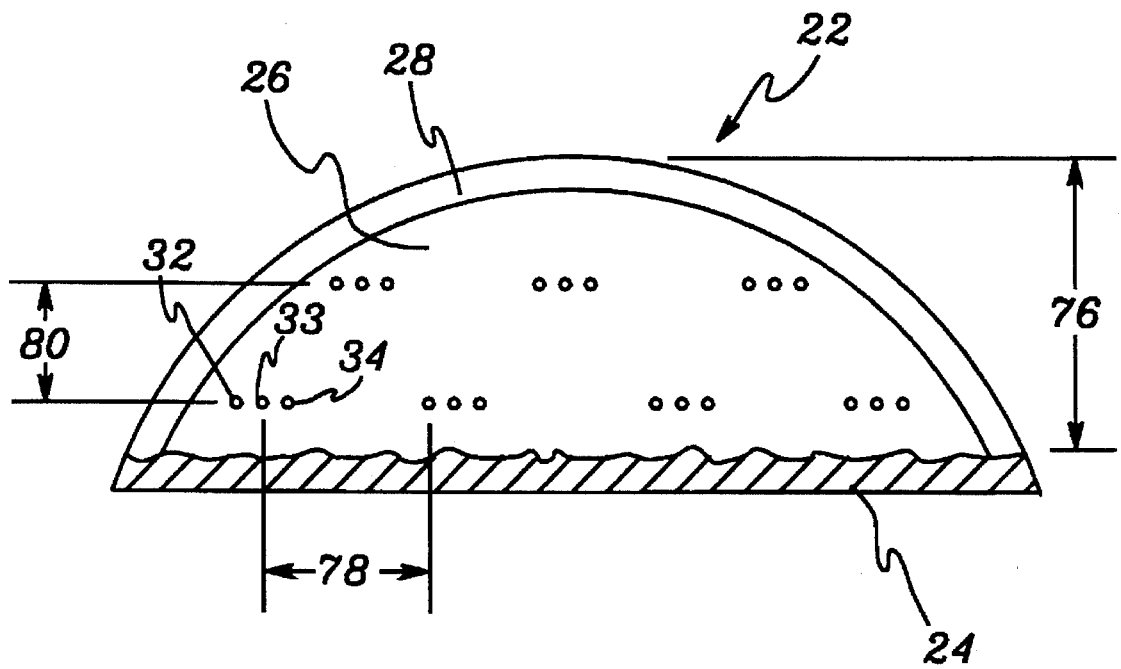
FIG. 5 depicts a side view of the solid waste pile of FIG. 2.

FIG. 5 depicts a side view along line 5 of solid waste pile 22 of FIG. 2, and shows exemplary spacing for multiple sets of conduits. Assume solid waste pile 22 has a height 76 with respect to ground 24. Horizontal spacing between conduit sets is given as dimension 78, and vertical spacing between conduit sets is given as dimension 80. If height 76 were about 100 feet, then horizontal spacing 78 would preferably be about 100 feet and vertical spacing 80 would preferably be about 20 feet.

A method of forming a bulk material pile according to the present invention will now be described with reference to solid waste pile 22 in FIG. 2. The general concept is to form a bulk material pile such that a substantially horizontal cavity is created therein. During the formation of the bulk material pile, a conduit is established between the cavity and an area outside the bulk material pile. Once the cavity and conduit are in place, gas and/or liquid exchange can take place between the cavity and the area outside the bulk material pile.

Figure 6A:
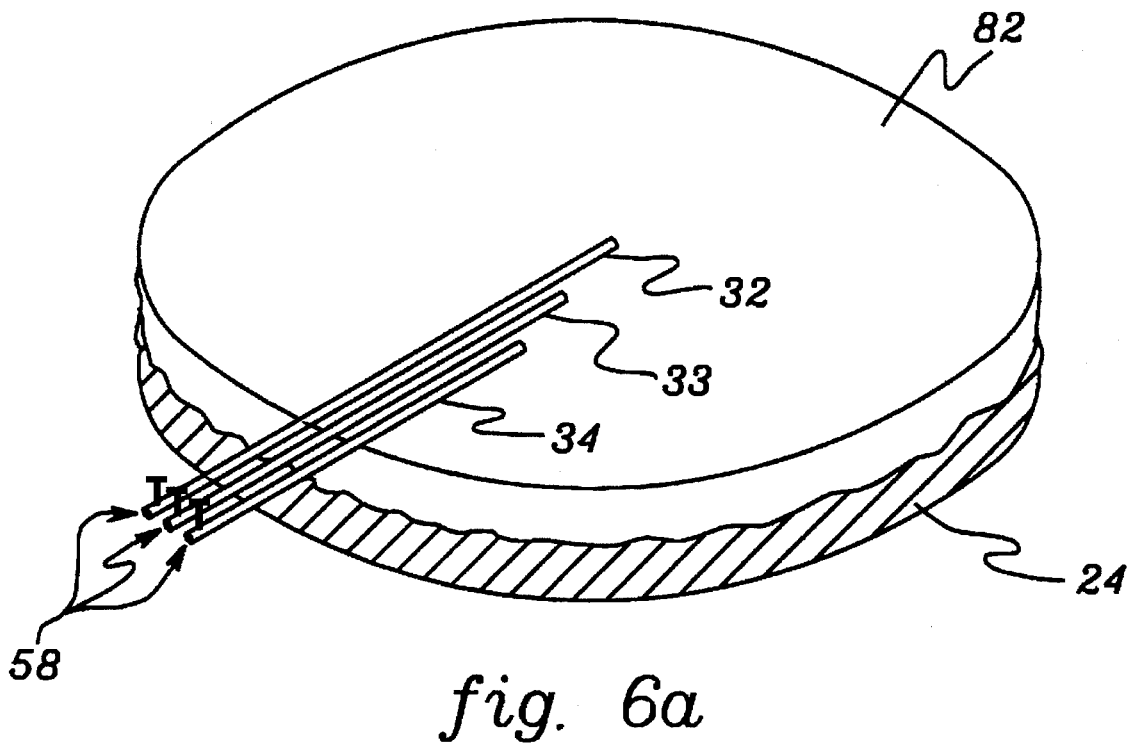
FIGS. 6a–6c depict various stages in the construction of the solid waste pile of FIG. 2.
Figure 6B:
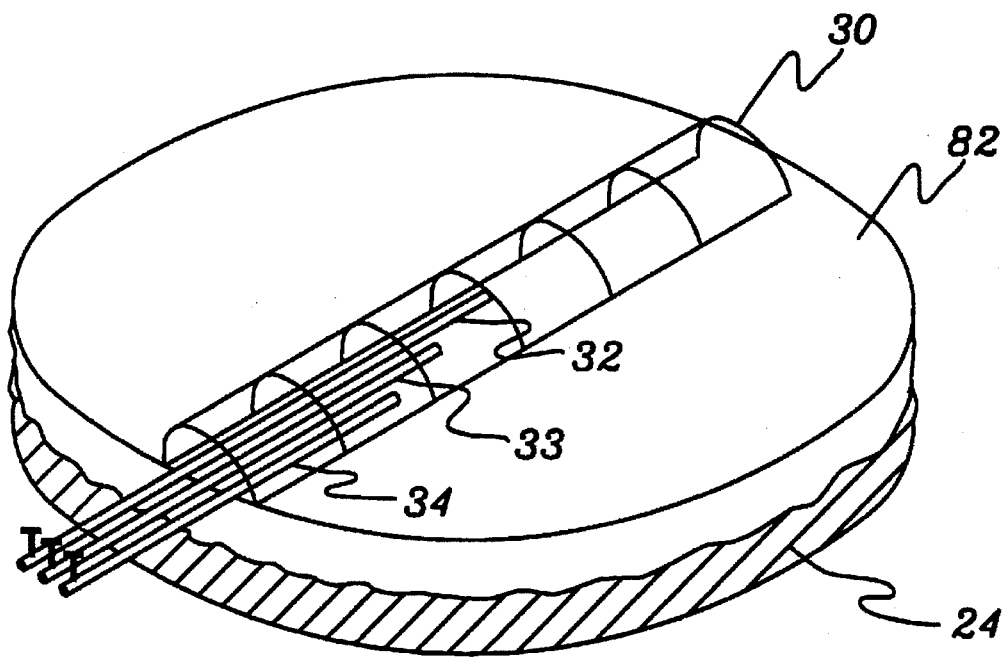
Figure 6C:
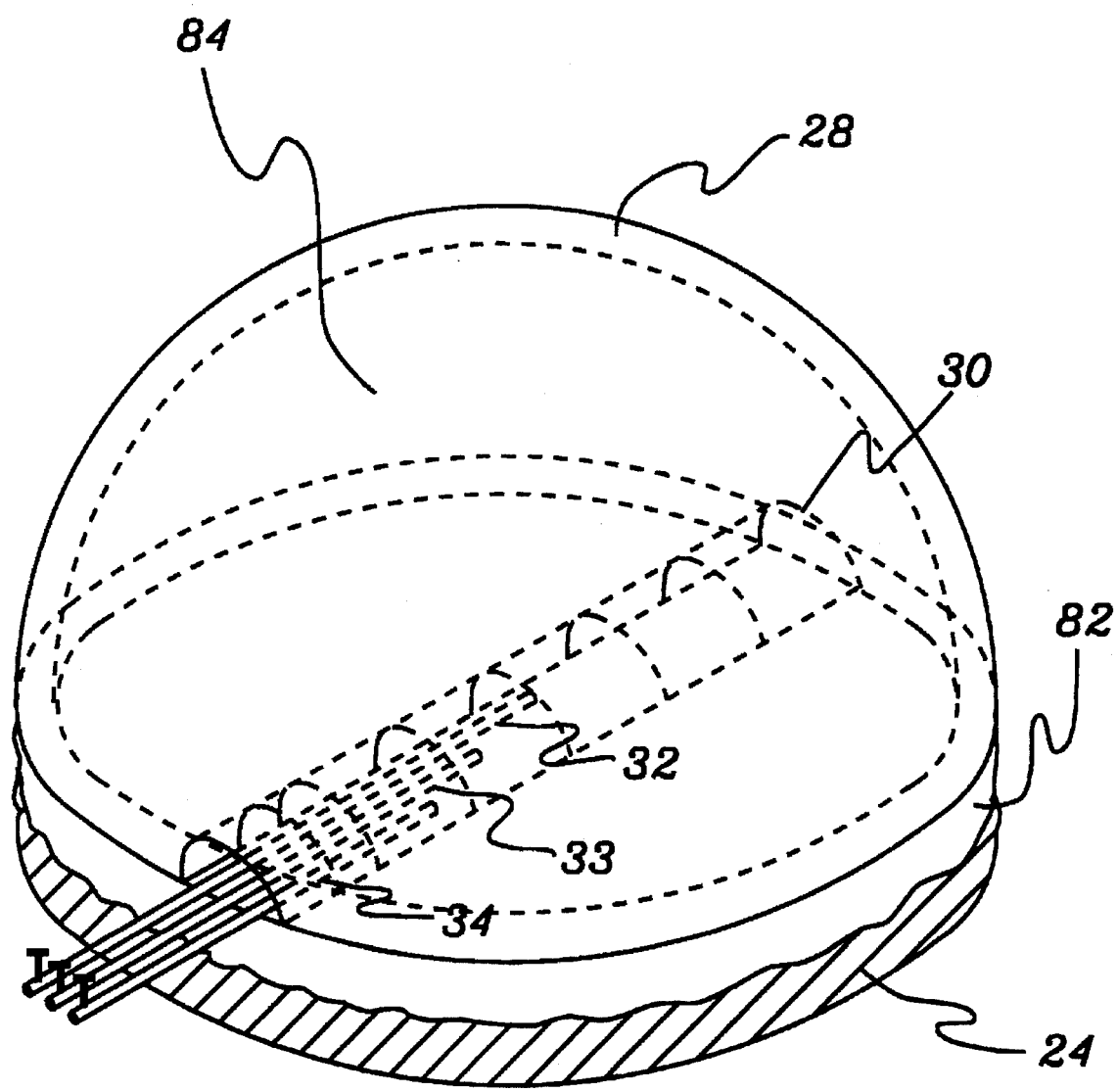

FIG. 6a depicts conduits 32, 33 and 34 from FIG. 2 placed substantially horizontally on a first layer 82 of solid waste. Layer 82 gently slopes toward the center thereof. The gentle slope helps prevent liquid from weeping to the exit points 58 of conduits 32, 33 and 34. It will be understood that if one wanted to extract a liquid from a bulk material pile, then the first layer of bulk material may be sloped toward the edge rather than the center. As shown in FIG. 6b, elongated leaching chamber 30 is then constructed so that it encloses the desired portions of conduits 32, 33 and 34. With the particular example given above using conventional sectioned leaching chambers, one could accomplish the task of establishing the conduit portions in a cavity by first placing the conduits inside inverted leaching chamber sections, connecting the reinforcing members to the relevant sections, turning over the leaching chamber sections and then connecting the sections (conventional sectioned leaching chambers include some type of interlocking closure mechanism). After the leaching chamber is placed, a second layer 84 of solid waste may then be deposited thereover, and the capping layer 28 added (see FIG. 6c). Preferably, several feet of solid waste is placed around and above elongated leaching chamber 30 and compacted with conventional compaction equipment before normal traffic is run over the chamber and the pile and cap finished.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

I claim:

1. Apparatus for gas and/or liquid exchange between a first area inside a bulk material pile and a second area outside the bulk material pile, the apparatus comprising:
   a leaching chamber for substantially horizontal placement within the first area during formation of the bulk material pile; and
   a conduit for placement partially within the leaching chamber and partially in the second area, thereby providing a medium for the gas and/or liquid exchange.

2. The apparatus of claim 1, wherein the conduit comprises a pipe having a first end within the leaching chamber and a second end in the second area.

3. The apparatus of claim 2 further comprising a valve coupled to the pipe at the second end.

4. The apparatus of claim 3 wherein the valve comprises a butterfly valve.

5. The apparatus of claim 2 wherein the pipe comprises a poly(vinyl chloride) pipe.

6. The apparatus of claim 2 wherein the pipe comprises a roll drainage pipe.

7. The apparatus of claim 1 further comprising one or more reinforcing members for reinforcing the leaching chamber.

8. The apparatus of claim 7 wherein the one or more reinforcing members comprises a horizontal reinforcing member and a vertical reinforcing member.

9. The apparatus of claim 1 wherein the leaching chamber comprises a plurality of openings sized to allow passage of the gas and/or liquid between the bulk material pile and the leaching chamber and discourage passage of the bulk material into the leaching chamber.

10. The apparatus of claim 1 wherein the leaching chamber comprises an elongated leaching chamber.

11. The apparatus of claim 1 wherein the conduit is for substantially horizontal placement between the leaching chamber and the second area.

12. The apparatus of claim 1 wherein the bulk material pile comprises a solid waste pile.

13. A method of exchanging gas and/or liquid between a bulk material pile and an area outside the bulk material pile, the method comprising steps of:
   forming the bulk material pile such that a cavity is created therein; and
   establishing a conduit between the cavity and the area outside the bulk material pile during the formation of the bulk material pile.

14. The method of claim 13 further comprising the step of exchanging the gas and/or liquid between the cavity and the area outside the bulk material pile through the conduit.

15. The method of claim 14, wherein the steps of forming and establishing together comprise steps of:
   depositing a first layer of bulk material on a base;
   laying a pipe substantially horizontally over the bulk material;
   covering a first portion of the pipe with a substantially horizontal leaching chamber, the cavity comprising the area within the leaching chamber; and
   depositing a second layer of bulk material over the leaching chamber such that a second portion of the pipe is accessible from the area outside the bulk material pile.

16. The method of claim 15 wherein the step of exchanging comprises exchanging the gas and/or liquid between the cavity and the area outside the bulk material through the pipe.

17. The method of claim 15, wherein the leaching chamber is elongated and wherein the step of laying comprises laying a plurality of pipes of different lengths such that the plurality of pipes reach different portions of the cavity.

18. The method of claim 17, wherein the elongated leaching chamber has a length L, wherein the plurality of pipes comprises a first pipe and a second pipe, and wherein the step of covering comprises steps of:
   covering a length of about L/3 of the first pipe with the leaching chamber; and
   covering a length of about (2*L)/3 of the second pipe with the leaching chamber.

19. The method of claim 14, wherein the bulk material pile comprises a solid waste pile producing a solid waste gas, and wherein the step of exchanging comprises removing the solid waste gas from the cavity to the area outside the bulk material pile.

20. The method of claim 14, wherein the bulk material pile comprises a solid waste pile, and wherein the step of exchanging comprises adding a liquid from the area outside the bulk material pile into the cavity for absorption into the solid waste pile.

21. The method of claim 20 wherein the step of adding comprises adding a leachate.

22. The method of claim 15 wherein the step of laying comprises laying the pipe at an incline toward a center of the first layer of bulk material.

23. A method of accelerating the decomposition of solid waste in a solid waste pile, comprising steps of:

forming the solid waste pile such that a liquid is injectable from an area outside the solid waste pile into a substantially horizontal cavity inside the solid waste pile; and injecting the liquid from the area outside the solid waste pile into the cavity, thereby increasing the moisture content of the solid waste to accelerate the decomposition thereof.

24. The method of claim 23 wherein the liquid comprises a leachate.

25. The method of claim 23 wherein the step of forming comprises steps of:

depositing a first layer of solid waste;

laying a pipe substantially horizontally over the first layer;

covering a first portion of the pipe with a substantially horizontal leaching chamber, the cavity comprising the area within the leaching chamber; and depositing a second layer of solid waste over the leaching chamber such that a second portion of the pipe is accessible from the area outside the solid waste pile.

26. The method of claim 25 wherein the step of injecting comprises injecting the liquid into the cavity from the area outside the solid waste pile through the pipe.

27. A method of removing a gas from a solid waste pile, comprising steps of:

forming the solid waste pile such that a substantially horizontal cavity is created inside the solid waste pile;

allowing the solid waste pile to produce the gas and enter the cavity; and removing the gas from the cavity to an area outside the solid waste pile.

28. The method of claim 27, wherein the step of forming comprises steps of:

depositing a first layer of solid waste;

laying a pipe substantially horizontally over the first layer;

covering a first portion of the pipe with a substantially horizontal leaching chamber, the cavity comprising the area within the leaching chamber; and depositing a second layer of solid waste over the leaching chamber such that a second portion of the pipe is accessible from the area outside the solid waste pile.

29. The method of claim 28 wherein the step of removing comprises removing the gas from the cavity to the area outside the solid waste pile through the pipe.

* * * * *